(12) United States Patent
Berkbuegler

(10) Patent No.: US 10,827,744 B2
(45) Date of Patent: Nov. 10, 2020

(54) LADDER STAND AND TREE SECUREMENT MECHANISM THEREFOR

(71) Applicant: Ronald Lee Berkbuegler, Troy, IL (US)

(72) Inventor: Ronald Lee Berkbuegler, Troy, IL (US)

( * ) Notice: Subject to any disclaimer, the term of this patent is extended or adjusted under 35 U.S.C. 154(b) by 0 days.

(21) Appl. No.: 15/954,999

(22) Filed: Apr. 17, 2018

(65) Prior Publication Data

US 2018/0228143 A1  Aug. 16, 2018

Related U.S. Application Data

(63) Continuation of application No. 14/949,129, filed on Nov. 23, 2015, now Pat. No. 10,010,068.

(51) Int. Cl.
*A01M 31/02* (2006.01)

(52) U.S. Cl.
CPC .................... *A01M 31/02* (2013.01)

(58) Field of Classification Search
CPC ..................................................... A01M 31/02
See application file for complete search history.

(56) References Cited

U.S. PATENT DOCUMENTS

| | | | | |
|---|---|---|---|---|
| 1,522,292 A | * | 1/1925 | Enssle | E06C 1/34 182/107 |
| 1,658,191 A | * | 2/1928 | Gravning | E06C 1/34 182/206 |
| 2,232,414 A | * | 2/1941 | Swann | E06C 1/34 182/206 |
| 2,775,489 A | | 12/1956 | Hagadorn | |
| 2,778,556 A | * | 1/1957 | Johnson | E06C 1/34 182/206 |
| 3,336,999 A | | 8/1967 | McSwain | |
| 4,469,195 A | | 9/1984 | Sartain | |
| 4,483,416 A | * | 11/1984 | Garcia | E06C 7/48 182/107 |
| 4,995,476 A | | 2/1991 | Buck | |
| 5,279,390 A | | 1/1994 | Phillips | |
| 5,368,127 A | | 11/1994 | Phillips | |
| 5,388,664 A | | 2/1995 | Bator | |
| 5,460,240 A | * | 10/1995 | Jones | E06C 1/34 182/116 |
| 5,590,738 A | | 1/1997 | Hunt et al. | |
| 6,199,660 B1 | | 3/2001 | Meeks | |

(Continued)

OTHER PUBLICATIONS

X-Stand Treestands; Jaws of a Shark Grip of a Gator safety sheet, published no later than Sep. 15, 2015.

*Primary Examiner* — Colleen M Chavchavadze
(74) *Attorney, Agent, or Firm* — Young Basile Hanlon & MacFarlane, P.C.

(57) ABSTRACT

A securement mechanism for a ladder tree stand includes jaws pivotably attachable to a platform. When open, a tree can pass between the jaws. A strap assembly attaches to the jaws. A tension can be applied to the strap assembly from the ground before climbing the tree to pivot the jaws to close around the tree. The strap assembly can be anchored to the tree so that the jaws are pulled closed against the tree. A respective end portion of the strap assembly can attach to each of the jaws between its pivot axis and free end. The strap assembly can include a pivot strap secured to the jaws and a tensioning strap connected to the tree and secured to the pivot strap to slide along its length.

23 Claims, 7 Drawing Sheets

(56) References Cited

U.S. PATENT DOCUMENTS

| | | | |
|---|---|---|---|
| 7,021,423 | B1 | 4/2006 | Pestrue et al. |
| 7,963,368 | B2 | 6/2011 | Scudera et al. |
| 8,011,476 | B1 | 9/2011 | Alcon |
| 8,122,998 | B2 | 2/2012 | Liles |
| 8,695,761 | B1 | 4/2014 | Berkbuegler |
| 8,794,383 | B2 | 8/2014 | Furseth et al. |
| 9,089,125 | B1 | 7/2015 | Fast |
| 9,326,500 | B2 | 5/2016 | Overbaugh |
| 9,332,748 | B2 | 5/2016 | Brown |
| 10,010,068 | B2 * | 7/2018 | Berkbuegler ......... A01M 31/02 |
| 2003/0192741 | A1 | 10/2003 | Berkbuegler |
| 2005/0178615 | A1 | 8/2005 | Woller et al. |
| 2007/0000726 | A1 | 1/2007 | Berkbuegler |
| 2008/0105490 | A1 | 5/2008 | Butcher |
| 2008/0142299 | A1 | 6/2008 | Berkbuegler |
| 2009/0229917 | A1 | 9/2009 | Berkbuegler |
| 2010/0018803 | A1 | 1/2010 | Schwenke et al. |
| 2014/0166400 | A1 | 6/2014 | Berkbuegler |
| 2014/0182969 | A1 | 7/2014 | Overbaugh |
| 2018/0027800 | A1 * | 2/2018 | Dyer ..................... A01M 31/02 |

* cited by examiner

LADDER STAND AND TREE SECUREMENT MECHANISM THEREFOR

CROSS-REFERENCE TO RELATED APPLICATION(S)

This application is a continuation of U.S. patent application Ser. No. 14/949,129, filed on Nov. 23, 2015, now U.S. Pat. No. 10,010,068, issued on Jul. 3, 2018, the entire content of which is hereby incorporated by reference.

FIELD

The present invention generally relates to ladder supported tree stands for hunters and more specifically to securement mechanisms for securing a ladder tree stand to a tree while standing on the ground.

BACKGROUND

Hunters frequently use tree stands that have elevated platforms to observe and hunt wildlife. Ladder supported tree stands include ladders that are attached to the platform and partially support the platform in use. In general, ladder tree stands are used by leaning the tree stand toward a tree until the rear portion of the stand engages the tree and the ladder is oriented generally upright. With conventional ladder stands, a hunter must climb the ladder to the platform before securing the top end portion of the stand to the tree. The first time the hunter climbs the ladder, the only connection between the stand and tree is the force of the stand leaning against the tree. If the stand slips or tips away from the tree, there is no restraint to prevent the stand from falling and potentially injuring the hunter.

SUMMARY

In one aspect, a ladder tree stand for supporting a sportsman at an elevated position above ground comprises a ladder assembly having a top end portion and a bottom end portion configured for engagement with the ground. A platform has a front end portion and a rear end portion. The front end portion is secured to the top end portion of the ladder assembly. The tree stand is configured to lean toward a tree in a support direction such that a portion of the tree stand away from the bottom portion of the ladder engages the tree to support the ladder assembly in a generally upright orientation with the platform positioned at the elevated position. A tree securement mechanism comprises at least one securement member movably attached to the platform for selectively moving relative to the platform from an open position to a closed position in which the securement member extends around at least a portion of the tree to engage the tree and restricts movement of the platform with respect to the tree. An anchor is configured to be mounted on the tree at a position spaced apart between the elevated position and the ground. A strap assembly comprises a strap configured to be operatively connected to the anchor and the securement member to move the securement member from the open position to the closed position when a tension is imparted upon the strap assembly. The strap is configured for being selectively tensioned to apply force to the anchor and securement member and move the securement member from the open position to the closed position and comprises a tensioner operatively connected to the strap to selectively maintain tension on a segment of the strap extending between the anchor and the securement member to hold the securement member in the closed position.

In another aspect, a tree securement mechanism is configured to secure a ladder tree stand to a tree. The tree stand comprises a ladder assembly and a platform configured to lean in a support direction against the tree. The tree securement mechanism comprises first and second jaws configured to be pivotally mounted on the platform in opposing relationship to pivot relative to the platform between an open position and a closed position. The first and second jaws in the open position define a gap shaped and arranged so that the tree can pass through the gap when the tree stand is leaned toward the tree in the support direction. The first and second jaws in the closed position are shaped and arranged to grip the tree and hold the tree stand in place with respect to the tree. A pivot strap has a first end portion, a second end portion, and a length extending between the first and second end portions. The first end portion is connected to the first jaw and configured to be selectively pulled to pivot the first jaw from the open position to the closed position. The second end portion is connected to the second jaw and configured to be selectively pulled to pivot the second jaw from the open position to the closed position. A tensioning strap is slidably attached to the pivot strap to slide along the length of the pivot strap. The tensioning strap is configured to be tensioned to pull the pivot strap in a tensioning direction to pivot the first and second jaws from the open position toward the closed position until the first jaw engages the tree and is prevented from pivoting further toward the closed position. Further tensioning of the tensioning strap pulls the pivot strap further in the tensioning direction and also slides the tensioning strap along the length of the pivot strap to pivot the second jaw toward the closed position after the first jaw engages the tree.

In another aspect, a tree securement mechanism is configured to secure a ladder tree stand to a tree. The tree stand comprises a ladder assembly and a platform configured to lean in a support direction against the tree. The tree securement mechanism comprises first and second jaws each having a pivoting end portion, an opposite engagement end portion, and a length extending between the pivoting and engagement end portions. The pivoting end portions of the first and second jaws are configured to pivotally mount the first and second jaws on the platform in opposed relationship to pivot relative to the platform between an open position and a closed position. The first and second jaws in the open position define a gap shaped and arranged so that the tree can pass through the gap when the tree stand is leaned toward the tree in the support direction. The first and second jaws in the closed position are shaped and arranged to grip the tree and hold the tree stand in place with respect to the tree. A strap assembly comprises one or more straps defining a first strap end portion configured for being selectively pulled to pivot the first jaw from the open position toward the closed position and a second strap end portion configured for being selectively pulled to pivot the second jaw from the open position toward the closed position. The first strap end portion is attached to the first jaw at an attachment point located along the length of the first jaw between the pivoting end portion and the engagement end portion, and the second strap end portion is attached to the second jaw at an attachment point located along the length of the second jaw between the pivoting end portion and the engagement end portion.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
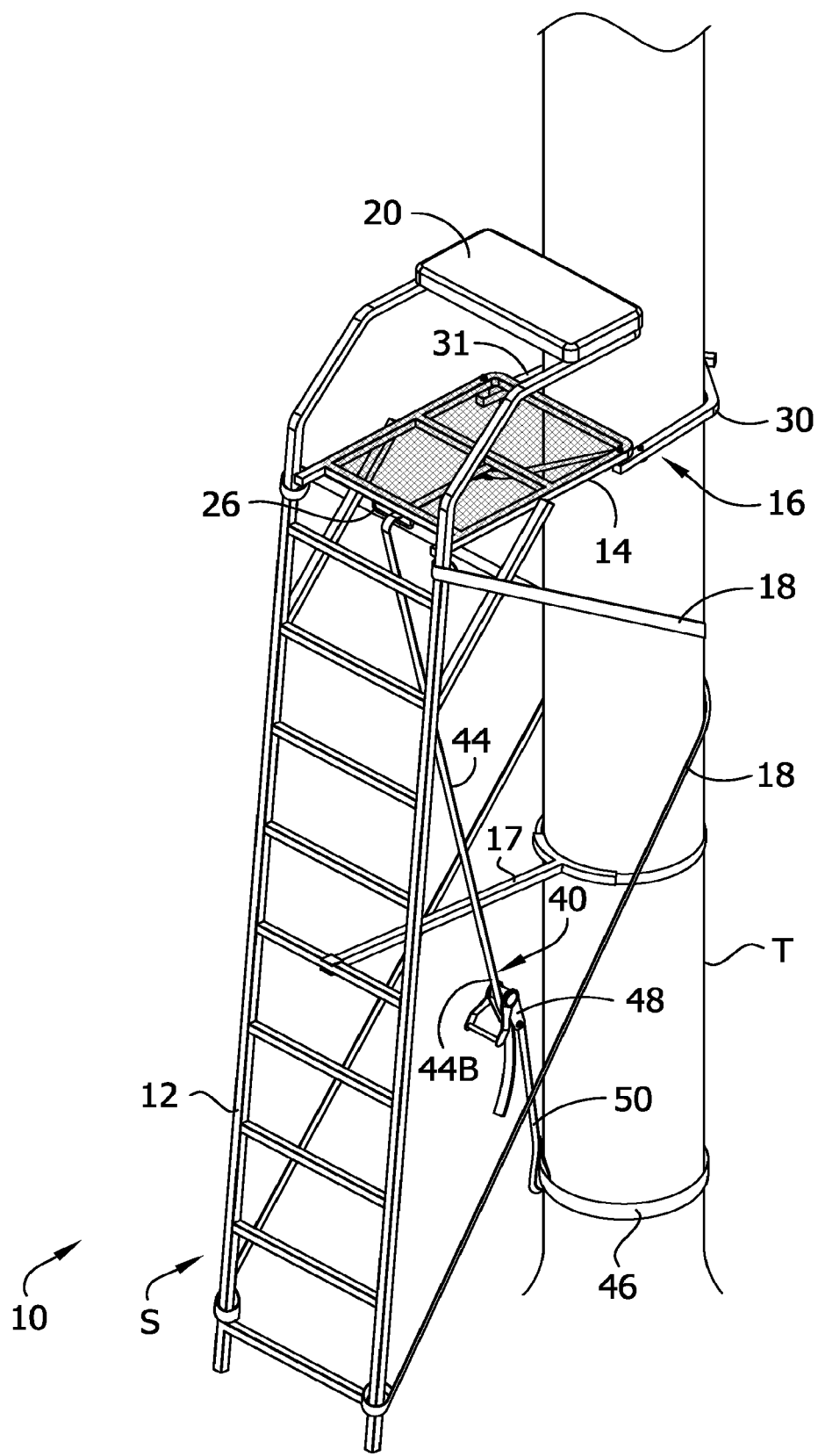
FIG. 1 is a perspective of a tree stand secured to a tree.

Referring to FIG. 1, a ladder tree stand for supporting a sportsman at an elevated position above ground is generally indicated at reference number 10. The tree stand 10 includes a ladder assembly 12 and a platform 14. The tree stand 10 is configured to lean toward a tree T in a support direction S until the platform 14 or another portion of the tree stand spaced apart from the bottom portion of the ladder assembly engages the tree. The engagement between the tree T and platform 14 supports the ladder 12 in a generally upright orientation, and the ladder supports the platform at an elevated position. As will be discussed in further detail below, the tree stand 10 further includes a securement mechanism 16 configured to selectively grip the tree T. When activated, the securement mechanism 16 restricts movement of the platform 14 with respect to the tree T, including inhibiting the tree stand from moving opposite the support direction S away from the tree. The securement mechanism 16 holds the platform 14 to the tree. Although the tree stand 10 is shown incorporating the securement mechanism 16, it will be understood that the securement mechanism could be a retrofit installment on an existing ladder tree stand without departing from the scope of the invention.

The ladder assembly 12 has a top end portion and a bottom end portion spaced apart along a height. The platform 14 is attached to the top end portion of the ladder assembly 12, and the bottom end portion is configured for engagement with the ground at a position spaced apart from the base of the tree T. In the illustrated embodiment, the ladder assembly 12 includes rungs extending laterally between two vertically extending legs. But other embodiments which can use only a single leg, for example, extend upward along the centers of the rungs without departing from the scope of the invention. Suitably, the ladder assembly 12 can be a fully assembled ladder or can be formed from two or more selectively separable and stackable ladder segments without departing from the scope of the invention.

Figure 2:
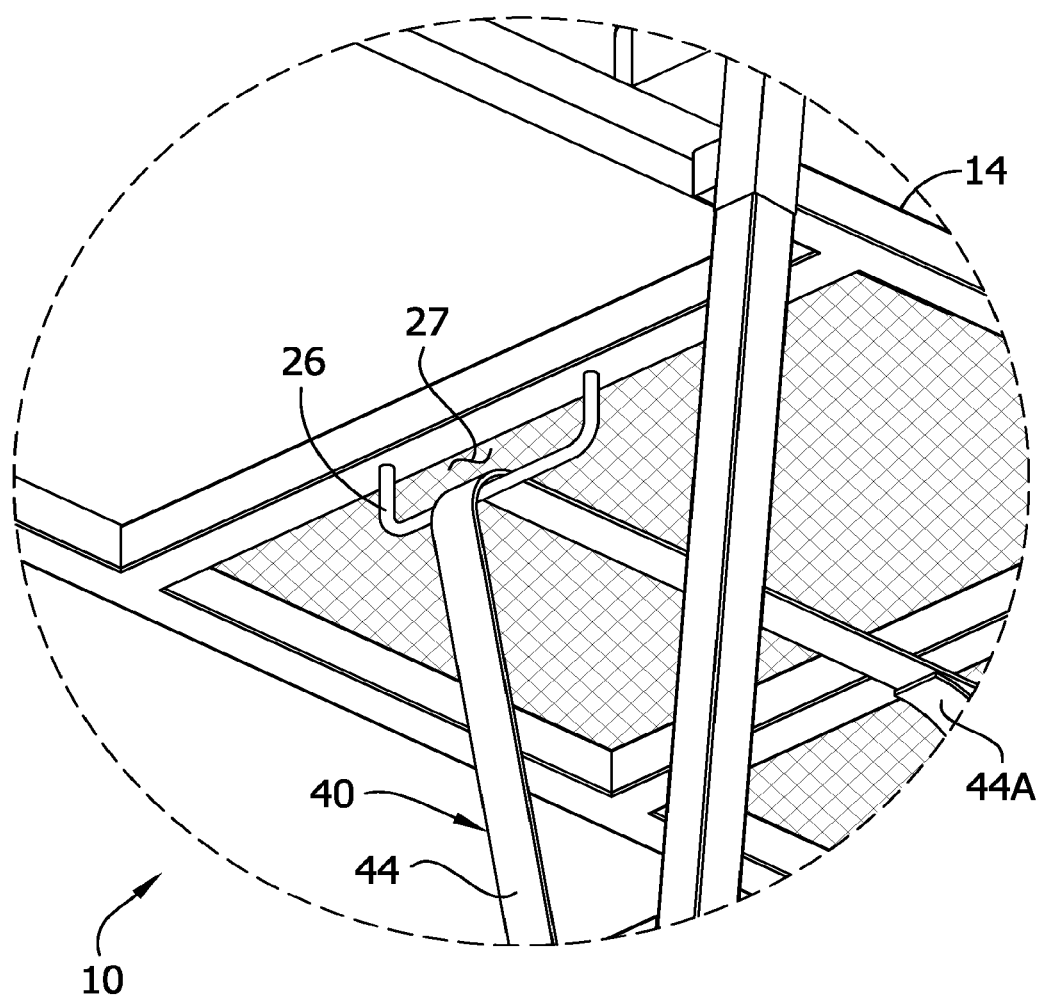
FIG. 2 is an enlarged fragmentary perspective of the tree stand including a strap routing member thereof.

The platform 14 has a front end portion secured to the top end portion of the ladder 12 and a rear end portion configured for engagement with the tree T. In the illustrated embodiment, a seat 20 is mounted on the platform 14. But in other embodiments, the platform does not include a seat to provide more room for standing on the platform. Other structures, such as a shooting rest (not shown), may be mounted on the platform. Although not shown in the illustrated embodiment, the rear end portion of the platform 14 may define teeth or other structures for gripping the tree T. Referring to FIGS. 2-3B, a strap routing member 26 is mounted on the front end portion of the platform 14. In the illustrated embodiment the strap routing member 26 is a U-shaped bracket that is fixed to the front end portion of the platform 14 and defines a channel 27 for receiving a strap. Other types of strap routing members can also be used without departing from the scope of the invention. Suitably, the strap routing member 26 is configured to provide a structure about which a strap can turn under tension from a horizontally extending segment to a more vertically extending segment. As will be discussed in further detail below, the strap routing member is configured to route one or more straps of the tree securement mechanism 16 toward a bottom end portion of the tree T.

Referring to FIG. 1, in addition to the securement mechanism 16, the illustrated tree stand 10 includes two other features that help secure it to the tree T. A standoff bracket 17 extends between the ladder 12 and the tree T at a location spaced apart between the platform 14 and the ground to support the ladder. As one skilled in the art will appreciate, ladders 12 can tend to bow inward under load. The standoff bracket 17 prevents the ladder from bowing inward by providing a support for the middle of the ladder 12, between the ladder 12 and the tree T. Although the standoff bracket 17 prevents the ladder 12 from bowing inward, it tends to push the upper end portion of the tree stand 10 away from the tree T, which creates a need for improved securement to the tree before climbing the ladder. In addition to the standoff brackets 17, two crossing straps 18 extend from the sides of the platform 14 around the rear of the tree T and connect to the ladder 12 at a location near the ground. The crossing straps 18 can be attached to the platform 14 before the tree stand 10 is leaned against the tree T. When the stand 10 is leaned against the tree, the straps 18 hang down where a user can manipulate them to cross them around the rear of the tree T and secure them to the ladder. Although this provides a measure of protection against the stand 10 falling or slipping away from the tree T, it has been found that the platform 14 can still shift around the circumference of the tree even after the straps 18 have been secured. Moreover, because the straps 18 engage the tree T at a position below the platform 14, the platform 14 can still tend to separate from the tree if the stand 10 begins to tip away.

Figure 3A:
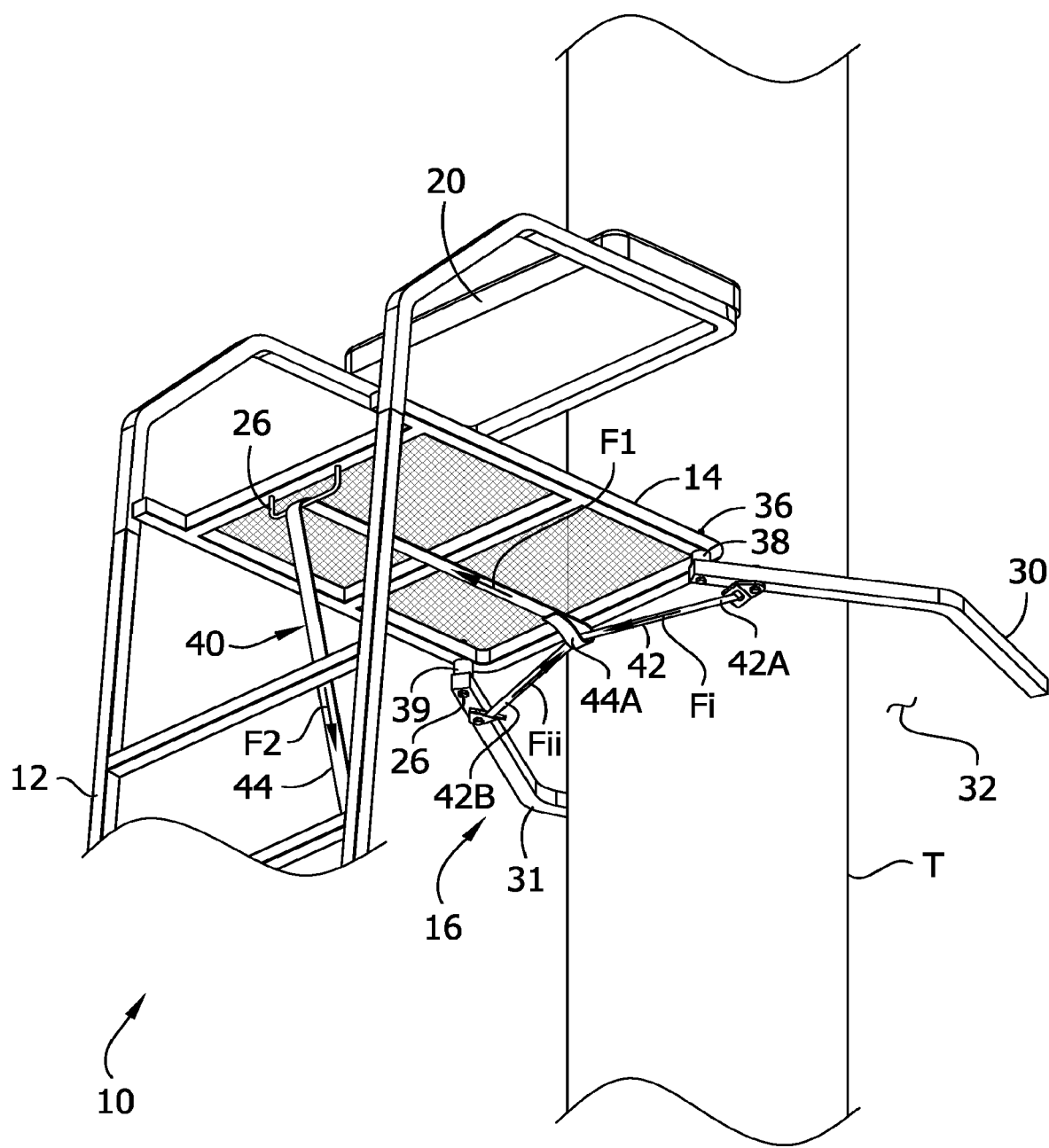
FIG. 3A is an enlarged fragmentary underside perspective of the tree stand and tree illustrating a tree securement mechanism thereof in an open position.
Figure 3B:
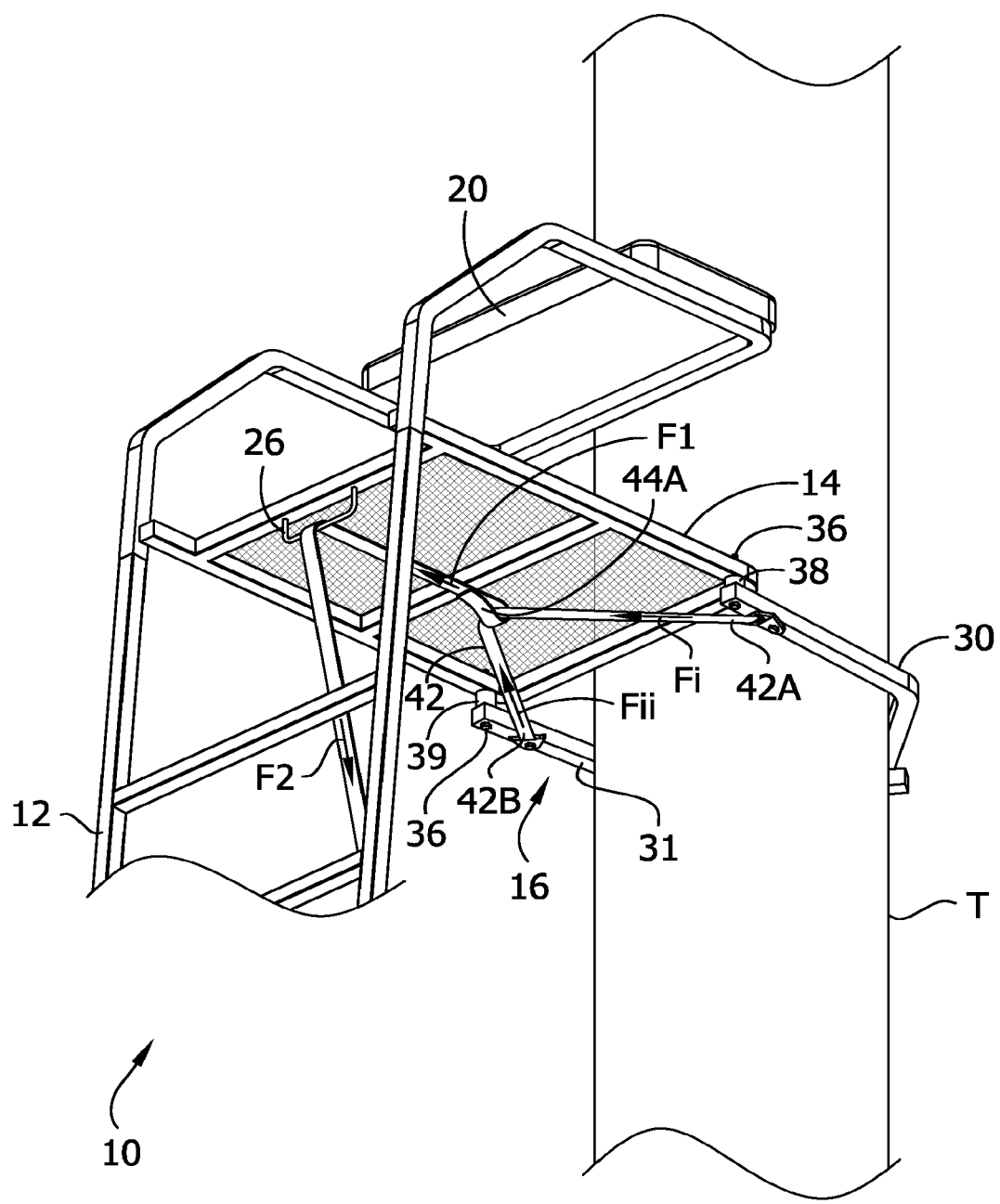
FIG. 3B is the perspective of FIG. 3A but illustrating the tree securement mechanism in a closed position.
Figure 4:
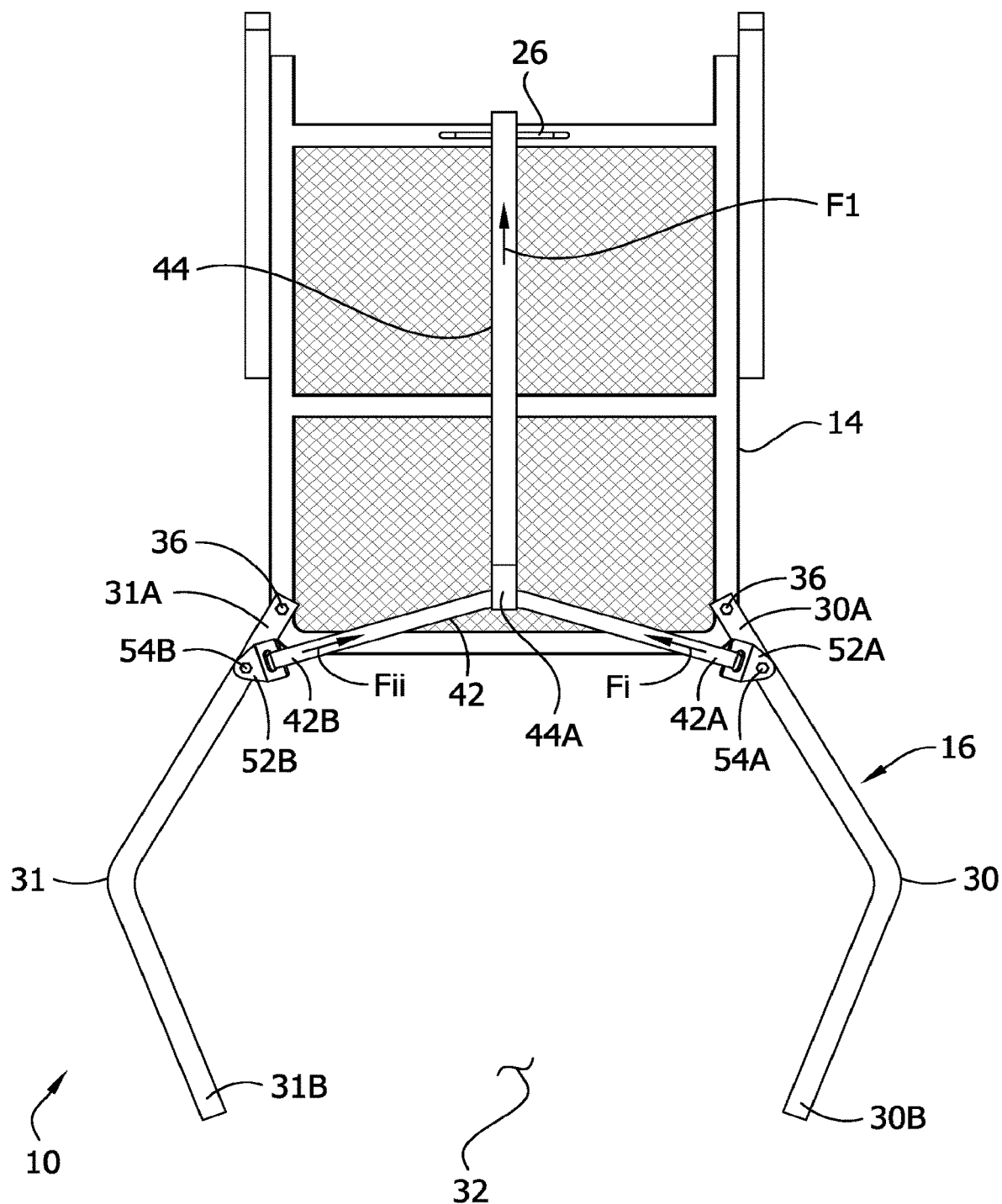
FIG. 4 is a bottom plan view of a platform of the tree stand.

Referring to FIGS. 3A-4, the tree securement mechanism 16 includes opposing first and second jaws 30, 31 that are pivotably mounted on the rear end portion of the platform 14. The jaws 30, 31 are selectively pivotable relative to the platform 14 from an open position (FIGS. 3A and 4) in which the jaws define a gap 32 to a closed position (FIG. 3B) in which the jaws are configured to extend around at least a portion of the tree T. In the open position, the gap 32 is preferably shaped and arranged so that the tree T can pass through the gap when the tree stand 10 is leaned toward the tree in the support direction S. In the closed position, the jaws 30, 31 close or at least narrow the gap 32 and engage the tree T to inhibit the tree stand 10 from slipping or falling away from the tree. For example, the jaws 30, 31 are preferably shaped and arranged to grip the tree T and hold the tree stand 10 in place with respect to the tree. In a preferred embodiment, the rear end portion of the platform 14 and the jaws 30, 31 extend circumferentially around the tree T in the closed position. In place of the jaws 30, 31, other embodiments can include one or more suitable securement members of other configurations that can selectively move relative to the platform to engage the tree and inhibit the tree stand from moving opposite the support direction away from the tree.

Figure 5:
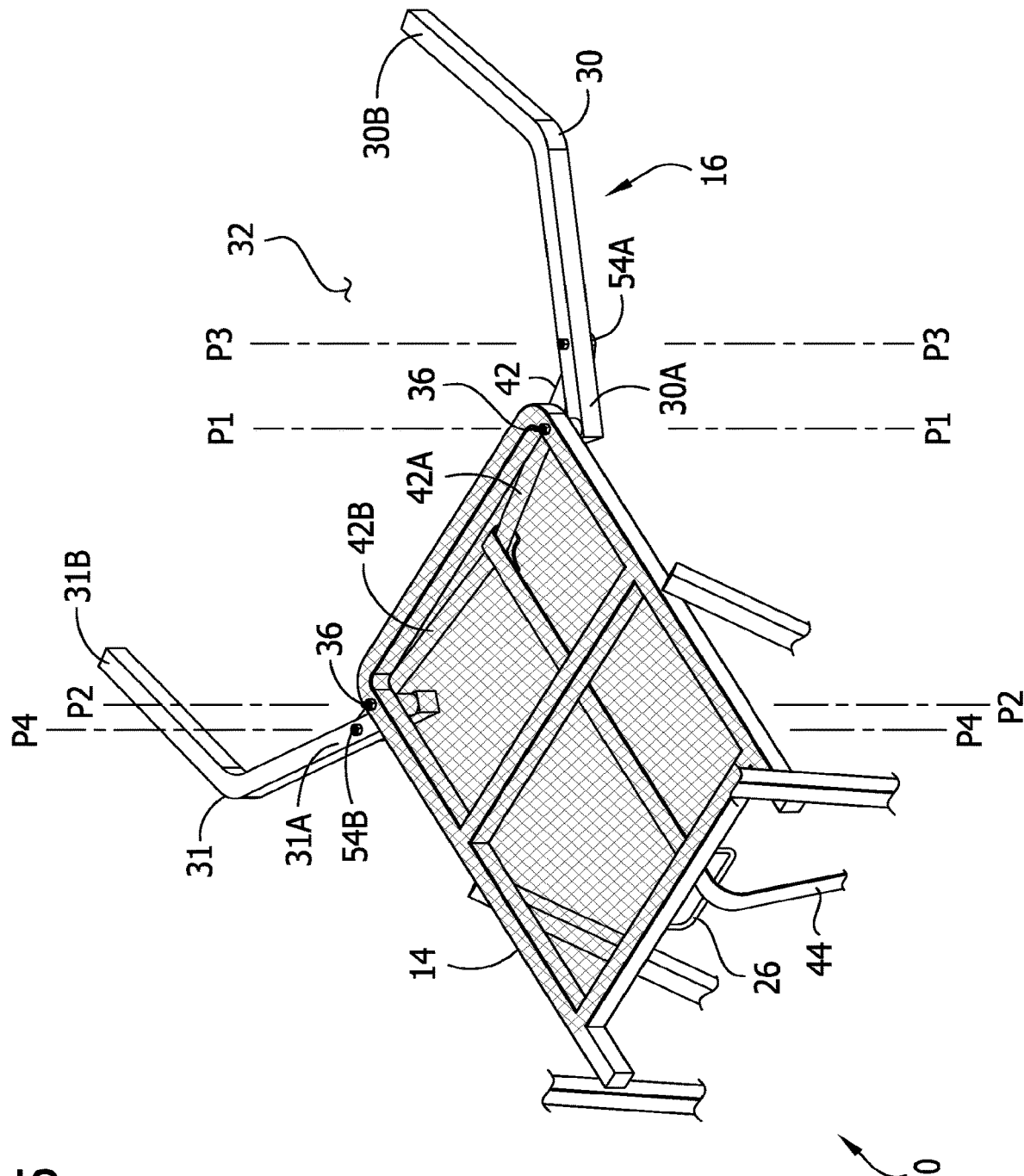
FIG. 5 is an enlarged fragmentary top perspective of the tree stand illustrating the tree securement mechanism in the open position.

In the illustrated embodiment, the jaws 30, 31 each have a pivoting end portion 30A, 31A, an opposite engagement end portion 30B, 31B, and a length extending between the pivoting and engagement end portions. The pivoting end portions 30A, 31A pivotably mount the first and second jaws 30, 31 on the platform 14 in opposed relationship to pivot between the open and closed positions. Any suitable jaw mount can be used to secure the jaws 30, 31 to the platform 14. As shown in FIG. 5, an exemplary jaw mount secures the first jaw 30 to pivot relative to the platform 14 about a first pivot axis P1 and the second jaw 31 to pivot relative to the platform about a second pivot axis P2. In the illustrated embodiment, bolts 36 secure the jaws 30, 31 to the platform 14 for pivoting, and the pivot axes P1, P2 are coincident with the longitudinal axes of the bolts. To install the jaws 30, 31 as a retrofit installation on a preexisting tree stand, it may be necessary to form holes in the platform for receiving the bolts 36. The engagement end portions 30B, 31B of the jaws 30, 31 are configured to define the gap 32 in the open position and to engage the tree T in the closed position. As will be discussed in further detail below, the tree securement mechanism 16 is configured to selectively pivot the jaws 30, 31 about the bolts 36 from the open position to the closed position until the engagement end portions 30B, 31B engage the tree. The sides of the tree T are clamped between the first and second jaws 30, 31, and the front and rear ends of the tree are clamped between the engagement end portions 30B, 31 B and the rear end portion of the platform 14.

Figure 6:
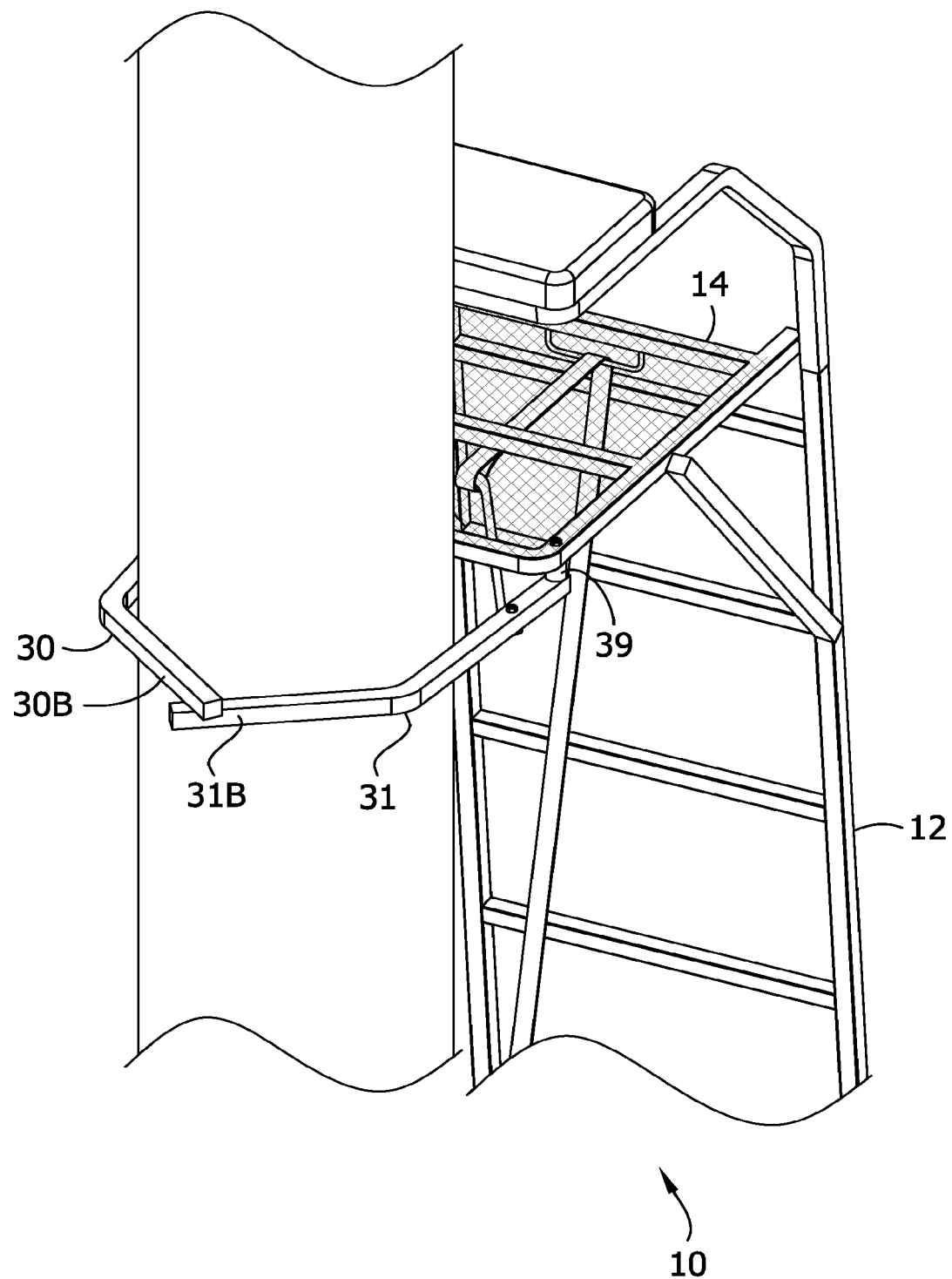
FIG. 6 is an elevation of the tree stand illustrating the tree securement mechanism securing the stand to the tree.

Referring to FIGS. 3A-3B and 6, in a preferred embodiment, the jaws 30, 31 are installed at different positions along the height of the tree stand 10 to allow the jaws to close around the whole circumference of the tree T. In the illustrated embodiment, a first spacer 38 is positioned between the first jaw 30 and the platform 14 and a second spacer 39 is positioned between the second jaw 31 and the platform 14. The bolts 36 extend through the spacers 38, 39. Each of the spacers 38, 39 has a height. In the illustrated embodiment, the height of the second spacer 39 is taller than the height of the first spacer 38 by at least the height of the first jaw 30. As a result, the first and second spacers 38, 39 position the second jaw 31 beneath the first jaw 30 when the tree securement mechanism 16 is closed as shown in FIG. 6. The engagement end portions 30B, 31B of the first and second jaws 30, 31 may, therefore, overlap one another in the closed position so that the tree securement mechanism may extend around the entire circumference of the tree T without the jaws interfering with each other. In addition, when the tree stand 10 is collapsed for storage and transport, the jaws 30, 31 may overlie one another so that the tree stand is compact and lies flat.

Referring to FIGS. 1-3B, the tree securement mechanism 16 includes a strap assembly 40 configured to selectively impart a tension on the jaws 30, 31 to pivot the jaws from the open position to the closed position and thereby close the jaws around the tree T. In general, the suitable strap assembly 40 will be operative to selectively impart a tension between the tree T and the jaws 30, 31 to pivot the jaws closed. In a preferred embodiment, the strap assembly 40 will include at least three end portions that form a generally Y-shaped configuration: a first end portion secured to the first jaw 30 and forming an end portion of one branch of the Y-shaped configuration, a second end portion secured to the second jaw 31 and forming an end portion of the other branch of the Y-shaped configuration, and a third end portion secured to the tree T and forming an end portion of the stem of the Y-shaped configuration. More specifically, the illustrated strap assembly 40 includes a pivot strap 42, tensioning strap 44, and anchor strap 46 arranged in the Y-shaped configuration. The pivot strap 42 includes first and second end portions 42A, 42B that are secured to the first and second jaws 30, 31, respectively, and form the branches of the Y-shaped configuration. The anchor strap 46 is secured to the tree T, and the tensioning strap 44 extends from the pivot strap 42 to the anchor strap 46 to form the stem of the Y-shaped configuration. Although the illustrated embodiment uses the pivot strap 42, tensioning strap 44, and anchor strap 46, other embodiments can use other arrangements of one or more straps without departing from the scope of the invention.

As shown in FIG. 1, the anchor strap 46 is configured to be mounted on the tree T at a position spaced apart between the elevated position of the platform 14 and the ground. For example, the anchor strap 46 can be mounted on the tree by being looped around the tree and fastened to itself The anchor strap 46 is configured to provide a secure anchor point against the tree so that the tensioning strap 44 can impart a tension between the anchor strap 46 and pivot strap 42 operative to pull the pivot strap toward the front end portion of the platform 14. Moreover, the anchor strap 46 is preferably mounted on the tree T near the ground so that a user can access the strap assembly 40 to operate the securement mechanism 16 while standing on the ground. Although the illustrated embodiment uses the anchor strap 46 as the anchor point on the tree T, other embodiments can use other types of anchors (e.g., screws that thread into the tree, etc.) without departing from the scope of the invention.

The tensioning strap 44 is operatively connected to the anchor strap 46 and pivot strap 42 to pull the pivot strap against the holding force of the tree T to move the jaws 30, 31 to the closed position. In the illustrated embodiment, a ratcheting tensioner 48 is connected by a length of strap 50 to the anchor strap 46 to selectively apply and maintain a tension in the tensioning strap 44. Other types of tensioning mechanisms or tension retainers may be used to apply and/or maintain a tension on the tensioning strap without departing from the scope of the invention.

As shown in FIGS. 1-3B, the tensioning strap 44 extends from a first end portion 44A that is connected to the pivot strap 42 to a second end portion 44B that is received through the ratcheting tensioner 48. A top segment of the tensioning strap 44 extends from a connection point with the pivot strap 42 at the first end portion 44A to the strap routing member 26, and a bottom segment of the strap extends from the strap routing member, through the ratcheting tensioner 48, and to the second end portion 44B. In the illustrated embodiment, the top segment is oriented generally horizontally and the bottom segment is oriented more vertically. Moreover, the top segment extends from the first end 44A in a generally forward direction. After the tensioning strap 44 extends through the channel 27 in the strap routing member 26, the bottom segment extends downward and rearward toward the tree T to be operatively received in the ratcheting tensioner 48.

Referring to FIGS. 3A-4, when the ratcheting tensioner 48 tensions the strap 44, it imparts a first force F1 on the top segment of the strap between the pivot strap 42 and strap routing member 26 and a second force F2 on the bottom segment of the tensioning strap between the strap routing member and anchor strap 46. The first force F1 is oriented generally forward of the platform 14 and the second force F2 is oriented generally rearward and downward of the platform. The strap routing member 26 is constructed to withstand a large amount of forces imparted thereupon as the tensioning strap 44 is tensioned. The strap routing member 26, thus, redirects the orientation of the tensioning strap 44 so that it can be anchored to the tree T. Since the tree securement mechanism 16 operates by engaging the jaws 30, 31 with the tree T, it is believed that likewise anchoring the strap assembly 40 on the tree may be preferable to anchoring the strap assembly on the tree stand 10 itself For example, an anchor point on the tree stand may experience large forces during tensioning that could tend to cause the tree stand to deform or buckle at the anchor point. Moreover, if a tree stand becomes damaged near an anchor point, tension in the strap assembly may be lost, which could cause the tree securement mechanism 16 to lose its grip on the tree. By comparison, it is believed that the tree T is far less likely to become damaged as a result of tensioning forces imparted upon it by the tree securement mechanism 16.

As discussed above, the pivot strap 42 has a first end portion 42A, a second end portion 42B, and a length extending between the first and second end portions. Referring to FIG. 4, the first end portion 42A is connected to the first jaw 30 at a first attachment point, and the second end portion 42B is connected to the second jaw 31 at a second attachment point. In the illustrated embodiment, the end portions 42A, 42B of the pivot strap 42 are pivotally connected to the first and second jaws 30, 31. Each of the end portions 42A, 42B of the pivot strap 42 is looped through a slot in a respective buckle 52A, 52B and secured to itself. Bolts 54A, 54B pivotably secure the buckle 52A, 52B to the jaws 30, 31 at the attachment points to allow the first and second pivot strap end portions 42A, 42B to respectively pivot about third and fourth pivot axes P3, P4 (FIG. 5) that are coincident with the longitudinal axes of the bolts. Other arrangements for attaching the pivot strap to the jaws can also be used without departing from the scope of the invention.

When the tensioning force F1 is imparted on the pivot strap 42, the first end portion 42A of the pivot strap imparts a force Fi on the jaw 30 at the first attachment point and the second end portion 42B imparts a force Fii on the jaw 31 at the second attachment point (FIG. 4). The force Fi is oriented generally parallel to the length of the first end portion 42A of the pivot strap 42, and the force Fii is oriented generally parallel to the length of the second end portion 42B of the pivot strap. Referring to FIG. 5, as the first and second jaws 30, 31 pivot about the first and second pivot axes P1, P2, the locations of the third and fourth pivot axes P3, P4 rotate about the first and second pivot axes P1, P2. At the same time, the first and second end portions 42A, 42B of the pivot strap 42 pivot about the third and fourth pivot axes. As a result the orientations of the forces Fi and Fii change as the pivot strap 42 pulls the jaws 30, 31 closed.

The location of the attachment of the pivot strap 42 to the jaws 30, 31 is selected to help prevent the jaws from opening if the tree stand 10 were to tip away from the tree T in use. The first end portion 42A is attached to the first jaw 30 at an attachment point located along the length of the first jaw between the pivoting end portion 30A and the engagement end portion 30B. The second end portion 42B is attached to the second jaw 31 at an attachment point located along the length of the second jaw between the pivoting end portion 31A and the engagement end portion 31B. Preferably the attachment points are spaced apart between the engagement end portions 30B, 31B of the jaws 30, 31 and the first and second pivot axes P1, P2, respectively. In a tipping event, the tree T would impart forces on the engagement end portions 30B, 31B that would tend to open the jaws 30, 31 by pivoting them in an opening direction about the pivot axes P1, P2. Because the engagement end portions 30B, 31B of the jaws 30, 31 are spaced apart from the pivot axes P1, P2, the jaws act as lever arms, and the forces imparted on the engagement end portions in a tipping event would have a mechanical advantage. But since the strap assembly 40 imparts forces Fi, Fii on the jaws 30, 31 at locations spaced apart from the pivot axes P1, P2 toward the engagement end portions 30B, 31B, the tension in the pivot strap 42 tends to counteract and reduce the mechanical advantage during tipping. Thus, it is believed that attaching the strap assembly 40 between the pivot axes P1, P2 and the engagement end portions 30B, 31B provides more reliable tree securement than, for example, attaching the strap assembly to portions of jaws located on the opposite sides of the pivot axes from the engagement end portions. This is because it is easier to space the connections of the strap assembly further from the pivot axes.

Referring to FIGS. 3A and 3B, the first end 44A of the tensioning strap 44 is looped around the pivot strap 42 to slide along the length of the pivot strap. Although the illustrated embodiment uses a looped end portion 44A to slidably connect the tensioning strap to the pivot strap, it will be understood that other types of sliding connections can also be used without departing from the scope of the invention. When a tension is imparted on the tensioning strap 44, the force F1 pulls a central portion of the pivot strap 42 located between the first and second end portions 42A, 42B forward toward a front end of the platform 14. This pulls the first end portion 42A and the second end portion 42B toward the front end portion of the platform 14 to pivot the first jaw 30 and the second jaw 31, respectively, from the open position toward the closed position.

Advantageously, since the tensioning strap 44 is slidably secured to the pivot strap 42, it can slide along the length of the pivot strap to pull each end portion 42A, 42B forward until both of the jaws 30, 31 engage the tree T. This may be particularly useful when securing the jaws 30, 31 to an irregularly shaped tree T. For example, the tensioning strap 44 can initially impart a pulling force F1 on the pivot strap 42 that pivots both of the jaws 30, 31 from the open position toward the closed position. Once one of the jaws 30, 31 engages one side of the tree T (e.g., a side of an irregularly shaped tree that extends further outward of a center axis centered between and perpendicular to the first and second pivot axes P1, P2 than an opposite side of the tree), further tensioning of the tensioning strap 44 simultaneously pulls the pivot strap 42 forward and causes the looped end 44A of the tensioning strap to slide along the length of the pivot strap. The looped end 44A of the tensioning strap 44 can automatically slide along the length of the pivot strap 42 to orient the tensioning strap so that the force F1 pulls the respective end portion of the pivot strap to pivot the unengaged jaw toward engagement with the tree T. For example, in at least some cases, the looped end 44A of the tensioning strap 44 can slide along the length of the pivot strap 42 toward the unengaged jaw after the first of the jaws 30, 31 engages the tree. Thus, it can be seen that, by tensioning the tensioning strap 44 to slide along the length of the pivot strap 42, the first and second jaws 30, 31 are positioned to grip an irregularly shaped tree T in the closed position.

As discussed above, the tree securement mechanism 16 can come preinstalled on the tree stand 10 or can be a retrofit installation. For retrofit applications, before using the tree stand 10, the securement mechanism 16 can be installed. The jaws 30, 31 are preferably pivotably mounted on the rear end portion of the platform 14. In addition, the strap routing member 26 can be installed on the front end portion of the platform 14 if one is not already present. Then, the assembler threads pivot the strap 42 through the looped end portion 44A of the tensioning strap 44 and pivotably mounts the first and second end portions 42A, 42B on the first and second jaws, respectively.

To secure the tree stand 10 to a tree T using the securement mechanism 16, the free end 44B of the tensioning strap 44 is threaded through the channel 27 in the strap routing member 26. The user also mounts the anchor strap 46 and tensioner 48 on the tree T. With the jaws 30, 31 in the open position, the user leans the tree stand 10 in the support direction S toward the tree T. The tree T passes through the gap 32 between the open jaws 30, 31 until the rear end portion of the platform 14 (e.g., teeth 24) engages the tree T. Before climbing the ladder 12, the user connects the free end portion 44B of the tensioning strap 44 to the ratcheting tensioner and closes the jaws 30, 31 around the tree T.

While standing on the ground, the user actuates the tensioner 48 to create a tension in the tensioning strap 44 to close the jaws 30, 31. At one end, the tensioning strap 44 pulls against the anchor strap 46 secured to the tree, and at the other end the tensioning strap pulls against the pivot strap 42. The tensioning strap 44 imparts a force F1 on the pivot strap 42 to pull the pivot strap forward of the platform 14. As the tensioning strap 44 pulls the pivot strap 42 forward, the tensioning strap slides along the routing member 26. The pivot strap 42 imparts a first force Fi on the first jaw 30 and a second force Fii on the second jaw 31. The first force Fi causes the first jaw 30 to pivot from the open position toward the tree T, and the second force Fii causes the second jaw 31 to pivot from the open position toward the tree. If the tree T has an irregular cross sectional shape, after one jaw has engaged the tree, the looped end portion 44A of the tensioning strap 44 slides along the length of the pivot strap 42 as it travels forward to pull the other jaw into contact with the tree. When the jaws 30, 31 reach the closed position the holding forces Fi, Fii imparted on the jaws by the pivot strap counteract opening forces imparted on the jaws by the tree in a tipping event.

As can be seen, the illustrated tree stand 10 includes a tree securement mechanism 16 that has several advantages. The tree securement mechanism 16 allows a user to close the jaws 30, 31 around the tree T before climbing the ladder 12. To prevent damage to the tree stand 10, the securement mechanism 16 closes the jaws 30, 31 using a tension that is imparted upon the tree T, rather than the ladder stand itself. If the securement mechanism 16 is used with an irregularly shaped tree, the sliding arrangement of the tensioning strap 44 ensures that both jaws 30, 31 are pulled into gripping engagement with the tree T. And when the jaws 30, 31 secure the tree stand 10 to the tree T, the locations of the attachment points of the pivot strap 42 counteracts the leverage of forces imparted in the jaws by the tree in a tipping event.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatuses, systems, and methods without departing from the scope of the invention, it is intended that all matter contained in the above description and shown in the accompanying drawings shall be interpreted as illustrative and not in a limiting sense.

What is claimed is:

1. A tree stand comprising:
   a ladder assembly;
   a structure secured to the ladder assembly configured to support an occupant of the tree stand;
   a jaw assembly mounted on the structure, the jaw assembly including movable first and second jaws pivotally secured to the structure such that each of the first and second jaws is inwardly movable to close the jaw assembly, the first and second jaws each including a first end that is pivotably connected to the structure such that the first and second jaws are each pivotable in relation to the structure about a single pivot axis, and a second, free end; and
   a strap assembly connected to the jaw assembly to move the first and second jaws inwardly upon the application of a closure force to the strap assembly, the jaw assembly and the strap assembly being configured and dimensioned such that the closure force is directed rearwardly away from the jaw assembly and towards the ladder assembly, the strap assembly including:
   a first strap having a first end pivotably connected to the first jaw and a second end pivotably connected to the second jaw such that the first strap pivots in relation to the first jaw and the second jaw upon application of the closure force to move the first and second jaws inwardly; and
   a second strap configured for engagement with the first strap between the first and second ends, wherein the second strap is configured to be slidable along the first strap in closing the jaw assembly.

2. The tree stand of claim 1, wherein the first jaw includes first and second segments and the second jaw includes first and second segments, the second segments being angled in relation to the first segments such that the second segments extend inwardly towards one another.

3. The tree stand of claim 1 further including a tensioner operatively connected to the strap assembly to apply the closure force to the strap assembly.

4. The tree stand of claim 1 further including an anchor, the strap assembly extending between the jaw assembly and the anchor.

5. The tree stand of claim 4 further including a routing member configured and dimensioned to receive and redirect the strap assembly such that the strap assembly extends between the anchor and the jaw assembly in a non-linear fashion.

6. The tree stand of claim 5, wherein the routing member defines an aperture configured and dimensioned to receive the strap assembly.

7. The tree stand of claim 1, wherein the second strap is directly connected to the first strap.

8. The tree stand of claim 1, wherein the second strap includes a loop, the first strap passing through the loop.

9. The tree stand of claim 1, wherein the second strap extends in transverse relation to the first strap.

10. The tree stand of claim 9, wherein the first end of the first jaw is pivotally secured to the structure at a first pivot point, the first end of the second jaw is pivotally secured to the structure at a second pivot point, the first end of the first strap is secured to the first jaw at a third pivot point, and the second end of the first strap is secured to the second jaw at a fourth pivot point.

11. The tree stand of claim 10, wherein the third and fourth pivot points are positioned radially outward of the first and second pivot points when the jaw assembly is open.

12. The tree stand of claim 1, wherein the structure includes a platform, and a seat mounted on the platform.

13. The tree stand of claim 1, wherein the first end of the first jaw is pivotally secured to the structure at a first pivot point, and the first end of the second jaw is pivotally secured to the structure at a second pivot point, wherein the first end of the first strap is connected to the first jaw between the first pivot point and the second end of the first jaw, and the second end of the first strap is connected to the second jaw between the second pivot point and the second end of the second jaw.

14. A tree stand comprising:
a structure configured to support an occupant of the tree stand;
a jaw assembly including a first jaw including a first end pivotally connected to the structure at a first pivot point and a free second end, and the second jaw including a first end pivotally connected to the structure at a second pivot point and a free second end, wherein the first jaw includes a first segment and a second segment extending fixedly from the first segment, and the second jaw includes a first segment and a second segment extending fixedly from the first segment, the first and second segments of each jaw extending at an angle such that the second segments extend inwardly towards one another;
a first strap extending between the first and second jaws, the first strap including a first end portion pivotably connected to the first jaw between the first pivot point and the second end of the first jaws and a second end portion pivotably connected to the second jaw between the second pivot point and the second end of the second jaw such that the first strap pivots in relation to the first jaw and the second jaw upon the application of a closure force to move the first and second jaws inwardly; and
a second strap connected to the first strap between the first and second end portions such that the closure force is applied to the first strap via the second strap, and wherein the second strap is configured to be slidable along the first strap in closing the jaw assembly.

15. The tree stand of claim 14, wherein the second strap is directly connected to the first strap.

16. The tree stand of claim 14, wherein the second strap extends in transverse relation to the first strap.

17. The tree stand of claim 14, wherein the first end portion of the first strap is secured to the first jaw at a third pivot point, and the second end portion of the first strap is secured to the second jaw at a fourth pivot point.

18. The tree stand of claim 17, wherein the third and fourth pivot points are positioned radially outward of the first and second pivot points when the jaw assembly is open.

19. The tree stand of claim 14, wherein the structure includes a platform.

20. The tree stand of claim 19, wherein the structure further includes a seat mounted on the platform.

21. A tree stand comprising:
a structure configured to support an occupant of the tree stand;
a jaw assembly including a first jaw with a first end pivotally connected to the structure at a first pivot point such that the first jaw is pivotable in relation to the structure about a single pivot axis and a free second end, and a second jaw with a first end pivotally connected to the structure at a second pivot point such that the second jaw is pivotable in relation to the structure about a single pivot axis and a free second end;
a strap assembly connected to the jaw assembly such that the first and second jaws are moved inwardly upon the application of a closure force to the strap assembly in a direction transverse in relation to a direction of movement of the first and jaws during closure, the strap assembly including:
a first strap having a first end portion pivotably secured to the first jaw at a third pivot point and a second end portion pivotably secured to the second jaw at a fourth pivot point such that the first strap pivots in relation to the first jaw and the second jaw upon application of the closure to move the first and second jaws inwardly, the third and fourth pivot points being positioned radially outward of the first and second pivot points when the jaw assembly is open; and
a second strap extending transversely from the first strap;
an anchor connected to the second strap such that the strap assembly extends between the jaw assembly and the anchor;
a tensioner operatively connected to the strap assembly to apply the closure force to the strap assembly; and
a routing member configured and dimensioned to receive and redirect the strap assembly such that the strap assembly extends between the anchor and the jaw assembly in a non-linear fashion.

22. The tree stand of claim 21, wherein the structure includes a platform, and a seat mounted on the platform.

23. The tree stand of claim 21, wherein the third pivot point is located between the first pivot point and the second end of the first jaw, and the fourth pivot point is located between the second pivot point and the second end of the second jaw.

* * * * *